US008644016B2

(12) United States Patent
Lu et al.

(10) Patent No.: US 8,644,016 B2
(45) Date of Patent: Feb. 4, 2014

(54) HARD DISK DRIVE MODULE

(75) Inventors: Huang-Jyun Lu, Taipei Hsien (TW); Chieh-Hsiang Lin, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 418 days.

(21) Appl. No.: 12/962,590

(22) Filed: Dec. 7, 2010

(65) Prior Publication Data

US 2012/0134093 A1    May 31, 2012

(30) Foreign Application Priority Data

Nov. 26, 2010    (TW) ................................ 99140882 A

(51) Int. Cl.
| H05K 7/00 | (2006.01) |
| H05K 7/16 | (2006.01) |
| H05K 5/00 | (2006.01) |
| H05K 7/14 | (2006.01) |
| H05K 7/02 | (2006.01) |

(52) U.S. Cl.
USPC ...... 361/679.33; 361/727; 361/755; 361/801; 361/809; 361/810

(58) Field of Classification Search
USPC .................. 361/679.33, 679.37–679.39, 727, 361/801–803, 807, 809, 810, 755
See application file for complete search history.

(56) References Cited

U.S. PATENT DOCUMENTS

| 7,068,502 | B2 * | 6/2006 | Chen et al. ............... 361/679.39 |
| 7,088,580 | B2 * | 8/2006 | Chen et al. ............... 361/679.32 |
| 7,405,950 | B2 * | 7/2008 | Zhang et al. .................. 361/810 |
| 7,408,771 | B2 * | 8/2008 | Chen et al. ............... 361/679.33 |
| 7,440,271 | B2 * | 10/2008 | Chen et al. ............... 361/679.33 |
| 7,477,512 | B2 * | 1/2009 | Sung ........................ 361/679.33 |
| 2007/0145866 | A1 * | 6/2007 | Huang et al. .................. 312/215 |
| 2007/0211425 | A1 * | 9/2007 | Zhao et al. .................... 361/685 |
| 2008/0116091 | A1 * | 5/2008 | Chen et al. .................... 206/307 |
| 2008/0123280 | A1 * | 5/2008 | Chen et al. .................... 361/685 |
| 2009/0224115 | A1 * | 9/2009 | Zhang et al. .................. 248/201 |

* cited by examiner

*Primary Examiner* — Timothy Thompson
*Assistant Examiner* — Sherman Ng
(74) *Attorney, Agent, or Firm* — Altis Law Group, Inc.

(57) ABSTRACT

A hard disk drive (HDD) module includes a bracket with two opposite sidewalls, an HDD, and a positioning element rotatably mounted between the sidewalls of the bracket. Each sidewall defines a leading slot and a latching slot communicating with the leading slot. Two blocks extend from opposite sides of the HDD. When the blocks enter the corresponding leading slots, the latching element is rotated to push the HDD to move, with the blocks moving into engagement with the corresponding latching slots, to assemble the HDD in the bracket.

7 Claims, 5 Drawing Sheets

HARD DISK DRIVE MODULE

BACKGROUND

1. Technical Field

The present disclosure relates to a hard disk drive (HDD) module.

2. Description of Related Art

With the development of servers, the number of hard disk drives (HDDs) received in the servers is becoming greater. Usually, the HDDs are fixed on HDD brackets of the servers by screws, and communicate with the servers by connectors mounted on the HDD brackets. However, it is inconvenient and cumbersome to assemble the HDDs in the HDD brackets or disassemble the HDDs from the HDD brackets.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
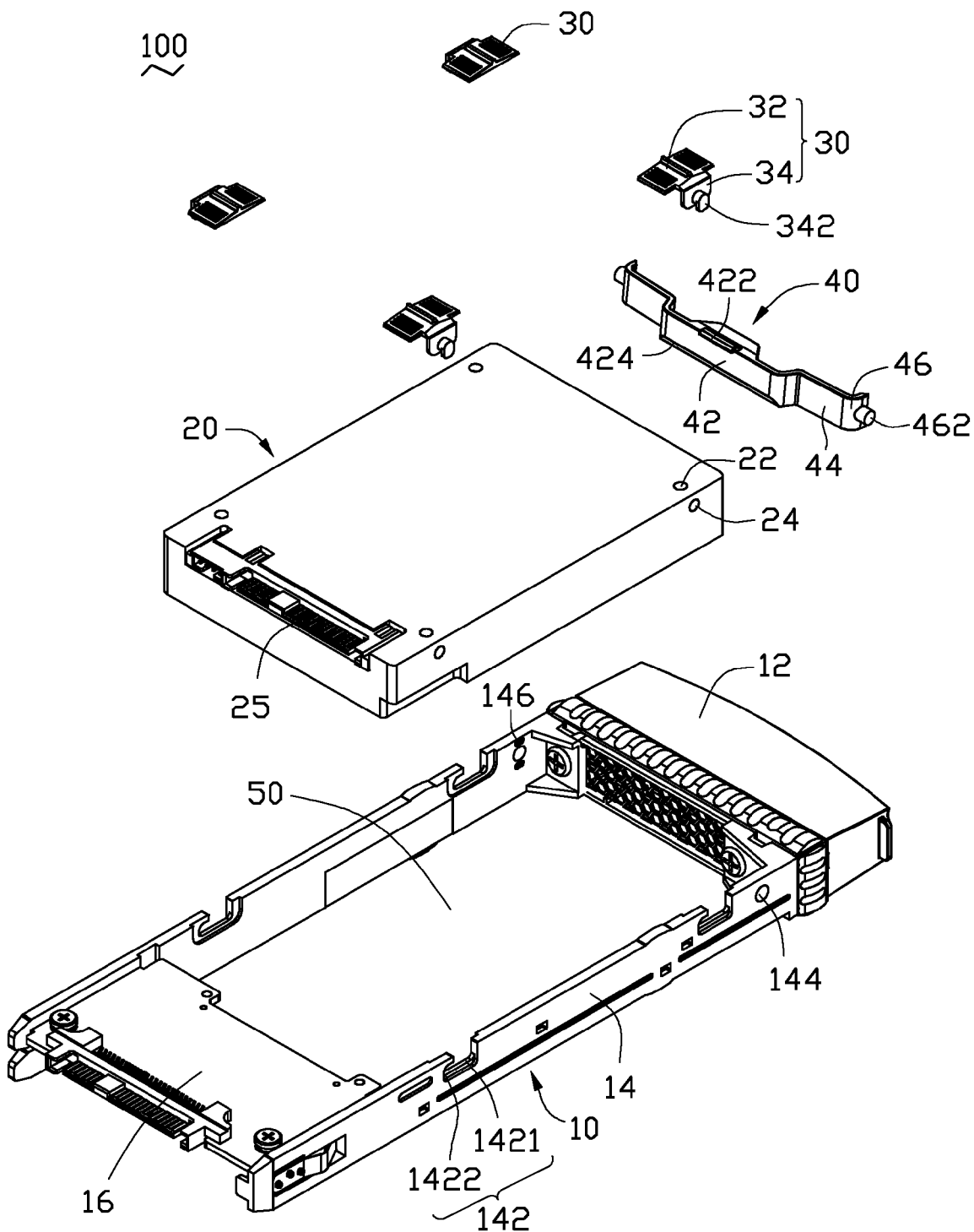
FIG. 1 is an exploded, isometric view of an exemplary embodiment of a hard disk drive (HDD) module; the HDD module includes an HDD, a latching element, a positioning element, and a bracket.

Referring to FIG. 1, an exemplary embodiment of a hard disk drive (HDD) module 100 includes a bracket 10, an HDD 20, four latching elements 30, and a positioning element 40. In the embodiment, the latching elements 30 are made of plastic.

The bracket 10 includes a front wall 12, two sidewalls 14 substantially perpendicularly extending rearward from opposite ends of the front wall 12, and a connection element 16 mounted to rear ends of the sidewalls 14. The front wall 12, the sidewalls 14, and the connection element 16 bound a receiving space 50. Two guiding slots 142 are defined in each sidewall 14. Each guiding slot 142 is approximately L-shaped, and includes a leading slot 1421 extending through a top side of the sidewall 14 and a latching slot 1422 extending rearward from a bottom of the leading slot 1421. A pivot hole 144 is defined in each sidewall 14, adjacent to the front wall 12. Two slots 146 are defined in an inner surface of each sidewall 14 and are respectively located above and below the pivot hole 144.

Four first fixing holes 22 are defined in four corners of a top of the HDD 20. Two second fixing holes 24 are respectively defined in each of opposite lateral surfaces of the HDD 20. A connector 25 is formed on a rear end of the HDD 20.

Figure 2:
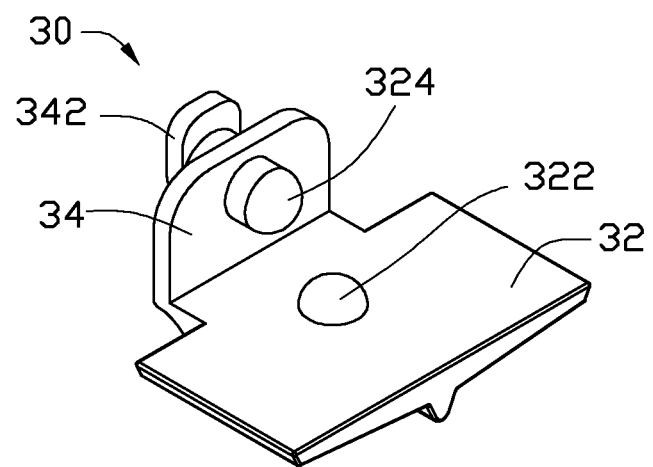
FIG. 2 is an inverted, enlarged view of the latching element of FIG. 1.

Referring to FIG. 2, each latching element 30 includes a base board 32 and a tab 34 substantially perpendicularly extending down from a side of the base board 32. A first positioning protrusion 322, corresponding to the first positioning hole 22, extends from a bottom of the base board 32. A second positioning protrusion 324, corresponding to the second position hole 24, extends from an inner surface of the tab 34 below the base board 32. A block 342, corresponding to the guiding slot 142, extends from an outer surface of the tab 34, opposite to the second positioning protrusion 324.

Figure 3:
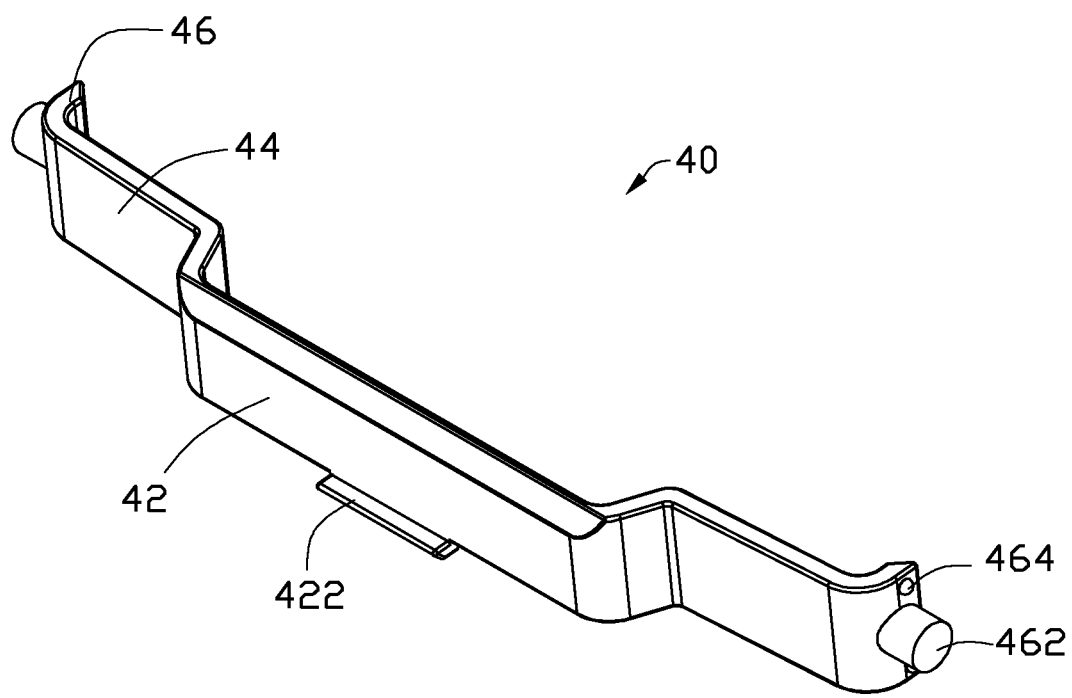
FIG. 3 is an inverted, enlarged view of the positioning element of FIG. 1.

Referring to FIG. 3, the positioning element 40 includes a stopping portion 42, two substantially L-shaped connection portions 44 slantingly extending forward from opposite ends of the stopping portion 42, and two end portions 46 extending forward from distal ends of the connection portions 44. A handle 422 extends rearward from a top side of the stopping portion 42. A bottom side of the stopping portion 42 opposite to the top side forms a slanted guiding surface 424. A shaft 462, corresponding to the pivot hole 144 of the sidewall 14 of the bracket 10, extends out from each end portion 46. Two positioning salients 464, corresponding to the slots 146 of the sidewall 14, protrude from each end portion 46, and are respectively located above and below the shafts 462.

Figure 4:
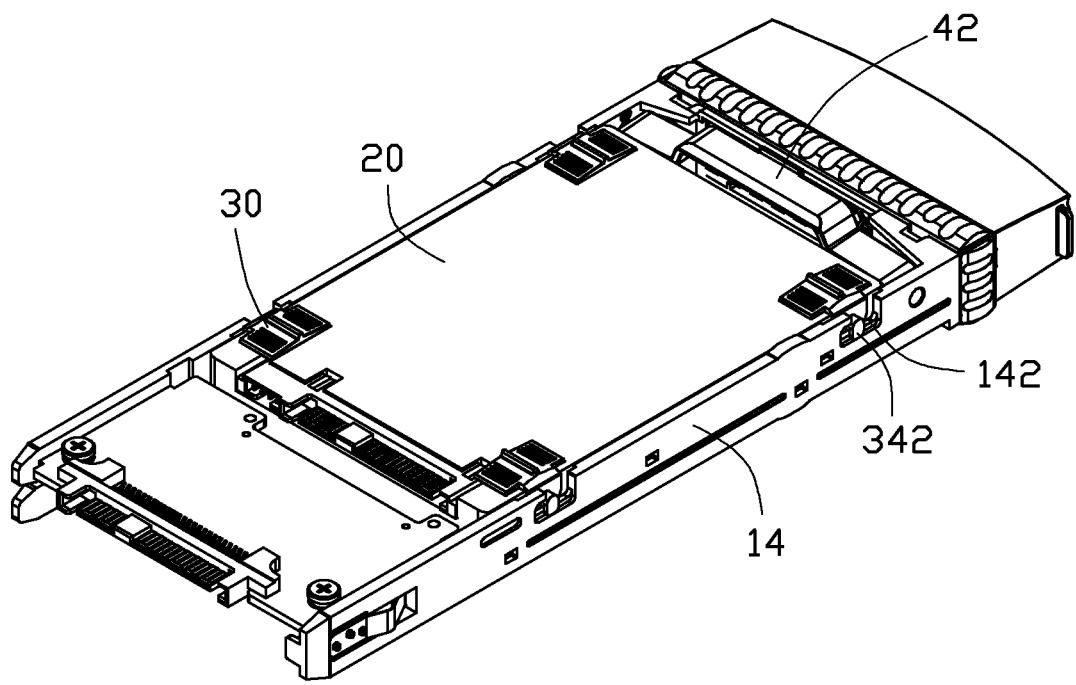
FIG. 4 is an assembled, isometric view of FIG. 1.
Figure 5:
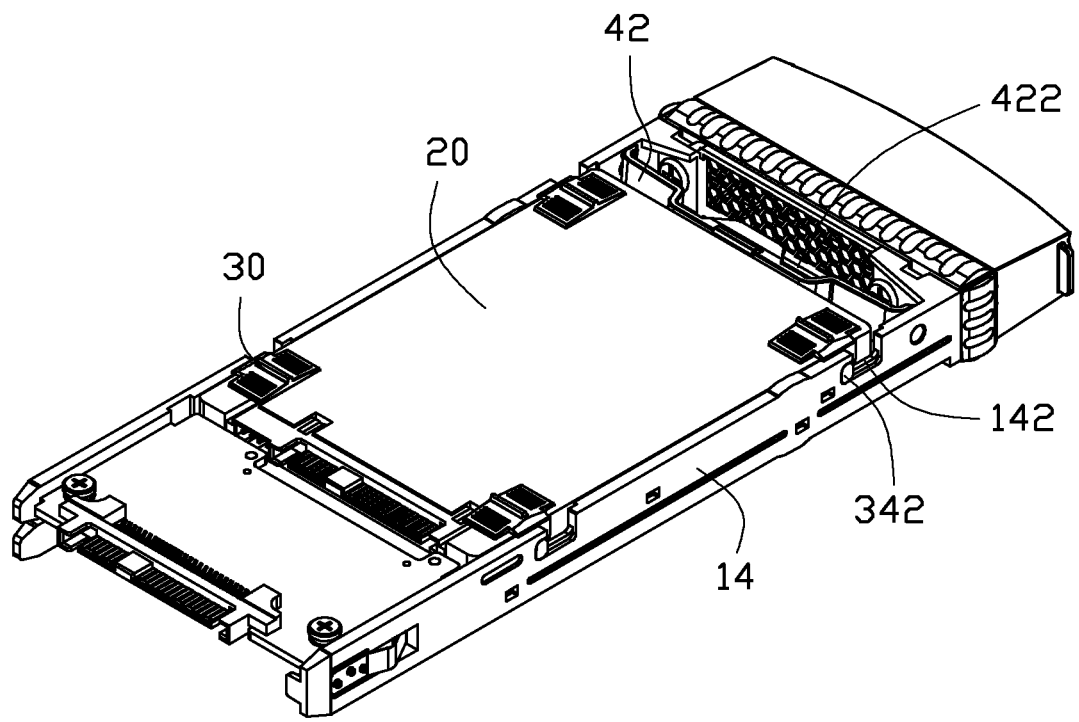
FIG. 5 is similar to FIG. 4, but showing another state.

Referring to FIGS. 4 and 5, in assembly, the positioning element 40 is accommodated in the receiving space 50 of the bracket 10. The shafts 462 of the positioning element 40 are pivotably engaged in the corresponding pivot holes 144 of the bracket 10. The first positioning protrusions 322 of the latching elements 30 are engaged in the first fixing holes 22 of the HDD 20, and the second positioning protrusions 324 of the latching elements 30 are engaged in the second fixing holes 24 of the HDD 20, thereby assembling the latching element 30 to the HDD 20. The combined assembly of the HDD 20 and the latching elements 30 is placed in the receiving space 50 of the bracket 10, with the blocks 342 of the latching elements 30 received in the leading slots 1421 of the corresponding guiding slots 142. The positioning element 40 is rotated by operating the handle 422 to push the HDD 20 to move towards the connection element 16 by the guiding surface 424, with the blocks 342 sliding from the leading slots 1421 to the latching slots 1422 and engaged in the latching slots 1422. At which time, the stopping portion 42 resists against a front end of the HDD 20, the positioning salients 464 of the positioning element 40 are engaged in the slots 146 of the corresponding sidewall 14 of the bracket 10, and the connector 25 of the HDD 20 is engaged with and electrically connected to the connection element 16.

In disassembling the HDD 20, the positioning element 40 is rotated upwards by operating the handle 422, thereby the stopping portion 42 releasing the front end of the HDD 20. Therefore, the HDD 20 is readily to be removed from the bracket 10.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A hard disk drive (HDD) module comprising:
a bracket comprising two opposite sidewalls, each sidewall defining a substantially L-shaped guiding slot, the guiding slot comprising a leading slot through a top of the sidewall, and a latching slot extending from a bottom of the leading slot;
an HDD;
two blocks connected to opposite sides of the HDD; and
a positioning element rotatably mounted between the sidewalls of the bracket;
wherein when the blocks enter the leading slots, the positioning element is operable to be rotated towards the HDD, to push the HDD to move, thereby the blocks moving to and engaged in the latching slots.

2. The HDD module of claim 1, wherein a pivot hole is defined in each sidewall of the bracket, the positioning element comprises a stopping portion to push the HDD and two end portions extending from opposite ends of the stopping portion, a shaft, corresponding to the pivot hole, extends out from each end portion to rotatably received in the pivot hole.

3. The HDD module of claim 2, wherein a slot is defined in each sidewall of the bracket and adjacent to the through hole, a positioning salient protrudes from each end portion, when the stopping portion of the latching element pushes the HDD to move to make each block engage in the corresponding latching slot of the bracket, the stopping portion resists against the HDD, and the positioning salient is engaged in the slot.

4. The HDD module of claim 2, wherein a handle extends from the stopping portion, to be operated to rotate the positioning element.

5. The HDD module of claim 2, wherein a guiding surface is formed on the stopping portion, opposite to the handle.

6. The HDD module of claim 1, further comprising two latching elements mounted to the HDD, wherein a first fixing hole is defined in each of opposite sides of a top of the HDD, a second fixing hole is defined in each of opposite lateral surfaces of the HDD, each latching element comprises a base board and a tab extending down from a side of the base board, a first positioning protrusion extends from a bottom of the base board to engage in the corresponding first fixing hole of the HDD, a second positioning protrusion extends from the tab below the base board to engage in the corresponding second fixing hole of the HDD, the block connected to a corresponding one of the sides of the HDD extends from the tab of a corresponding latching element, opposite to the second positioning protrusion.

7. The HDD module of claim 6, wherein the latching elements are made of plastic cement material.

* * * * *